United States Patent Office 3,485,487
Patented Dec. 23, 1969

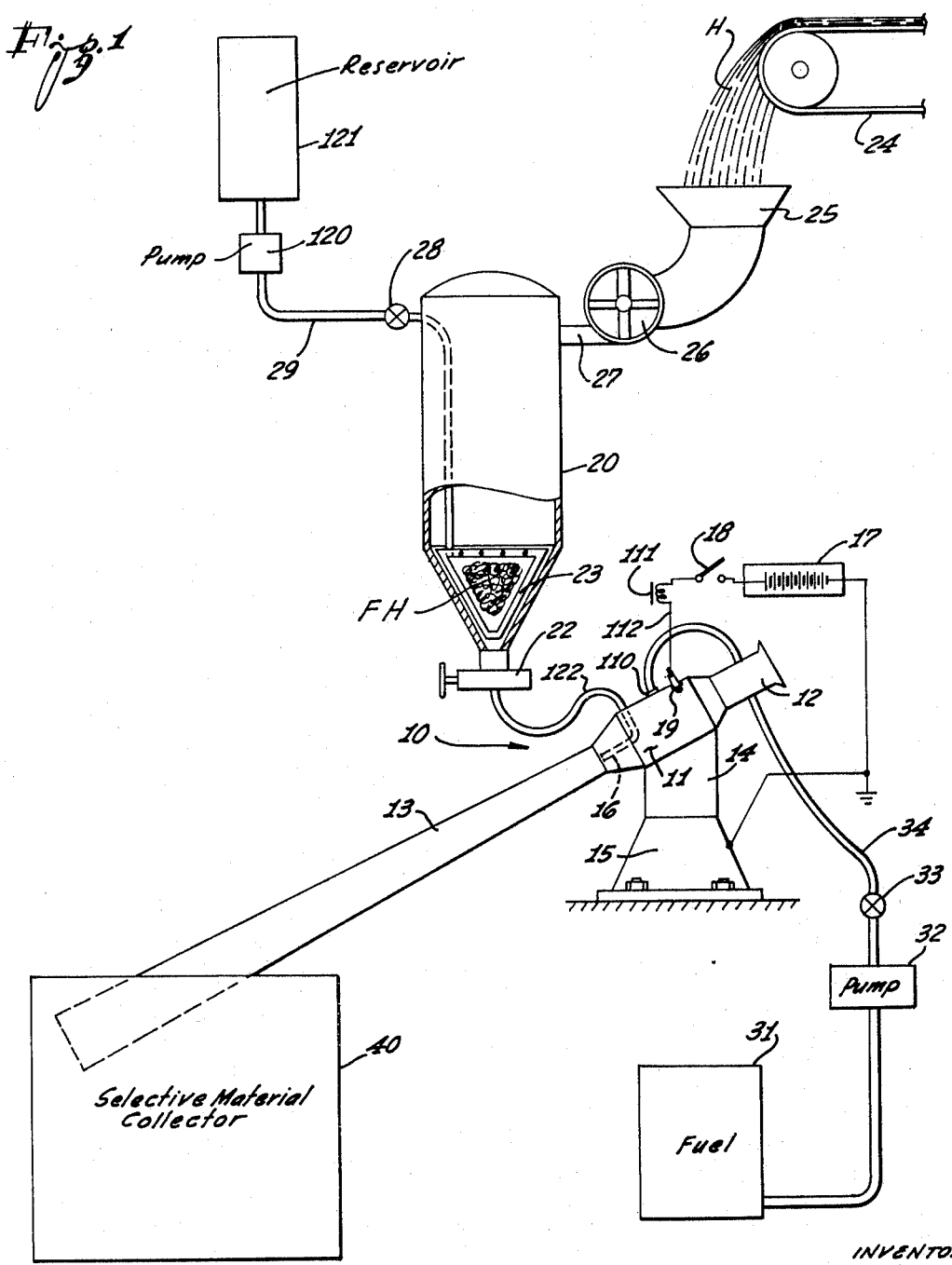

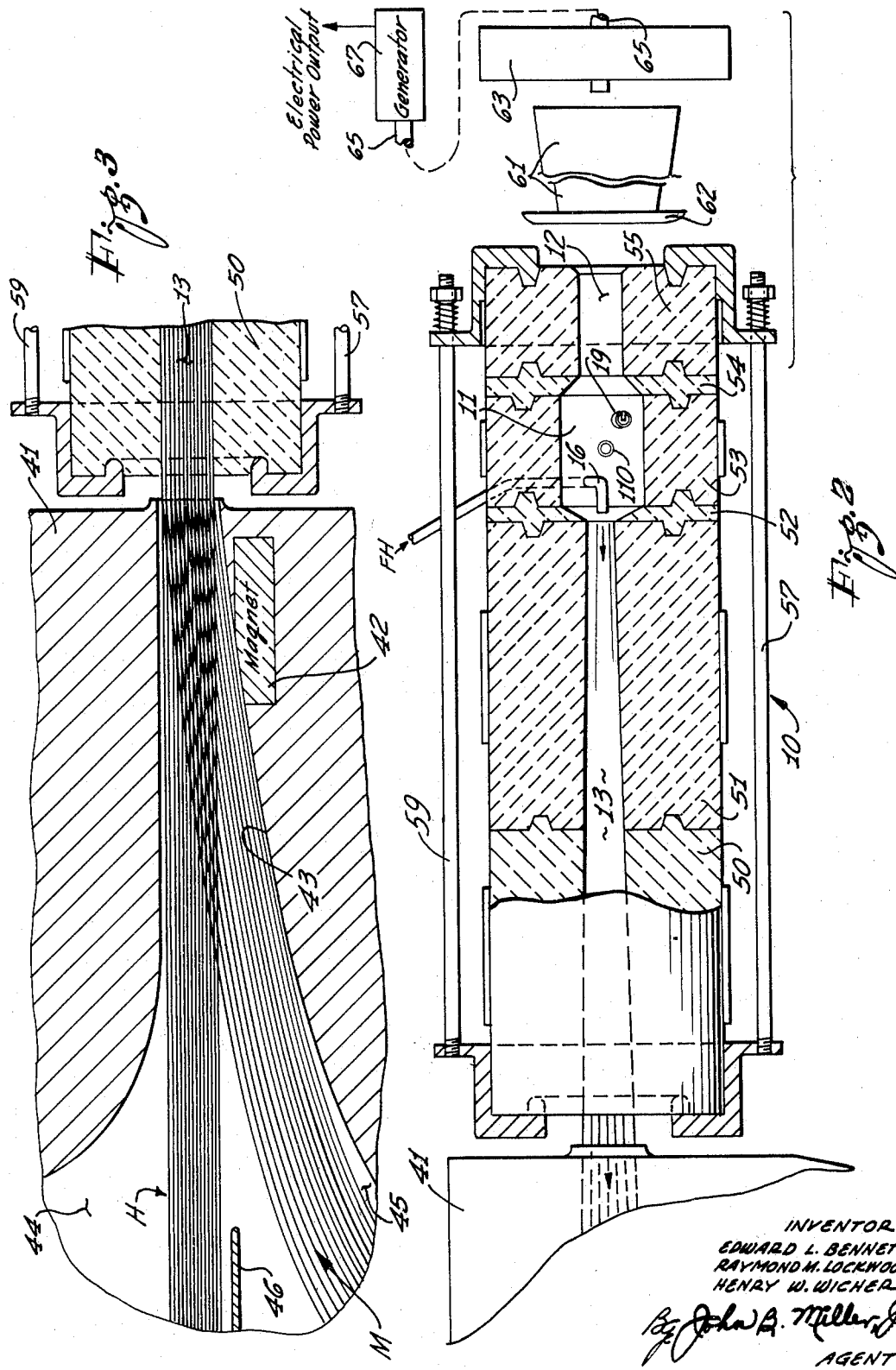

3,485,487
METHOD AND APPARATUS FOR BENEFICIATING ORES
Edward L. Bennett and Raymond M. Lockwood, Los Altos, and Henry W. Wichers, San Jose, Calif., assignors to Litton Precision Products, Inc., Palo Alto, Calif., a corporation of Delaware
Filed Jan. 10, 1967, Ser. No. 608,362
Int. Cl. F27b *21/00;* C21b *1/18*
U.S. Cl. 266—20                                6 Claims

ABSTRACT OF THE DISCLOSURE

Apparatus for concentrating low-grade, iron-bearing ores including a pulse jet engine into the exhaust pipe throat of which fluidized ore is periodically supplied. A collector receives the treated ore as it is expelled from the exhaust pipe of the engine and separates the iron-bearing particles from the gangue.

---

The present invention relates to a method and apparatus for economically concentrating low-grade ores and, more particularly, to a method and apparatus for beneficiating non-magnetic, ferruginous ores to recover iron therefrom and for concentrating other useful minerals in ferriferous ores.

With the ever-increasing industrial consumption of steel and the rapid exhaustion of high grade iron ores, considerable research has been directed in recent years to the removal of iron from the low-grade ferruginous ores. Unlike the high-grade ferruginous ores which are rich in iron and which demonstrate sufficient magnetic properties to permit magnetic separation, the low-grade ferruginous ores are essentially non-magnetic and are relatively poor in iron content.

The prior art is replete with references to processes for converting the non-magnetic, low-grade ferruginous ores to magnetic ferruginous ores. For example, efforts have been made to roast the non-magnetic ores (such as hematite $Fe_2O_3$) in a reducing atmosphere for widely-varied lengths of time to convert the hematite to its recoverable magnetic counterpart, magnetite $Fe_3O_4$. This expedient heretofore has required large amounts of heat and extended periods of time to perform, since the entire ore charge either must be heated to an extremely high temperature in order to reduce the proportion of hematite contained therein, or roasted at a lower temperature for many hours to achieve the same result. The economic disadvantages of the prior art processes for performing this conversion are readily apparent.

It is, therefore, an object of the present invention to reduce non-magnetic ferruginous ores to their magnetic counterparts by an efficient, economical method.

Another object of the invention is to reduce the amount of time previously required to beneficiate low-grade iron ores.

A further object of the invention is to simplify the equipment needed for the benefication of low-grade iron ores, thereby reducing the cost of such equipment and enhancing the reliability thereof.

A further object of the present invention is the magnetization of non-magnetic constituents of low-grade iron ores, which will enable the iron values to be economically separated therefrom by conventional methods.

It is a still further object of the present invention to beneficiate hematite ore to its magnetic counterpart, magnetite, by a continuous process performed in considerably less than one minute.

Moreover, large deposits of low-grade, ferriferous nickel ore, for example, exist in many areas of the United States; but, because such ore is typically no greater than two and one-half percent nickel, it is most often more economical to import nickel ore for use in the United States. This is true even though the imported ore may contain no more than one-half to one percent more nickel. It has been noted, however, that the low-grade nickel ore in the United States exists in deposits where the usuable nickel ore is closely bound to low-grade iron ore and this combination is mixed with other compounds, collectively called gangue.

Accordingly, it is another object of the present invention to facilitate the recovery of metals that are closely bound to iron in their natural state.

It is yet another object of the present invention to raise the iron content of ores containing iron that is closely bound to another useful metal which it is desired to extract.

These and other objects of the present invention are accomplished in one embodiment of an ore beneficating apparatus including a combustor through which fluidized non-magnetic iron bearing ore is passed for less than one minute, depending upon the size of the combustor (but typically for approximately one-fiftieth of a second), during which time the non-magnetic ore is converted to its magnetic counterpart. As will become apparent from the description which hereinafter follows, the non-magnetic ore is fed into an exhaust pipe throat of the combustor simultaneously as fuel is supplied to a combustion chamber of the combustor in which periodic explosions occur. The explosions and supersonic pressure waves uniformly heat the ore and blow the ore out the exhaust pipe and of the combustor into a collecting chamber. The non-magnetic ore, after passing through the combustor, is converted partially, if not entirely, to magnetic ore. The amount of magnetic ore in the final product, of course, depends upon the iron content of the original ore.

In the event one feeds non-magnetic hematite ore into the apparatus of the present invention, the converted magnetic iron ore may be separated from the small amount of remaining non-magnetic iron ore constituents and gangue by passing the collected residue over a magnetic separator, for example, which draws the magnetite from the gangue. In those instances where one uses the apparatus of the present invention to enhance the recovery of other valuable metals (such as nickel) which are closely-bound with iron in their natural state, the magnetization of the iron in the ore facilitates the separation of the iron and the closely-bound metal from the gangue. Other methods, well known to those skilled in the art, can then be used to separate the iron from the closely-bound metal. However, the ability of one to increase the concentration of the closely-bound metal by only 1% in the ore considerably increases the value of the ore.

These and other advantages and features which are believed to be characteristic of the present invention, both as to its organization and method of operation will be better understood from the following description considered in connection with the accompanying drawings in which two embodiments of the present invention are illustrated by way of example. It is to be expressly understood, however, that the drawings are for the purpose of illustration and description only and are not intended as a definition of the limits of the invention.

In the drawings:

FIGURE 1 schematically illustrates apparatus constructed in accordance with teachings of the present invention for beneficiating non-magnetic iron bearing ores;

FIGURE 2 is a fragmentary view of an alternate embodiment of the combustor portion of the beneficiating apparatus shown in FIGURE 1 as the invention might be practically used in an ore processing plant; and FIGURE 3 schematically illustrates one embodiment of a separator which is powered by the high velocity stream of gases and materials from the combustor portion of the beneficiating apparatus of the present invention.

Reference is now made to the drawings wherein the same or similar parts are designated by corresponding reference numerals throughout the several views. FIGURE 1 illustrates apparatus structured in accordance with teachings of the present invention for beneficiating ore, for example, for converting non-magnetic hematite into its magnetic counterpart, magnetite. In such an instance, a conveyor system 24 brings previously-discarded hematite material H to a hopper 25 of the beneficiating apparatus. The hematite material passes from the conveyor 24 through a constant-feed airlock 26 and a pipe 27 into a fluidizing tank 20. Fluidization of the hematite ore within the tank 20 may be accomplished by one of a number of methods well known to those skilled at the art, such as by fluidizing system 23 comprising pipes in which holes are drilled to allow the fluidizing medium (gas or liquid) to escape and separate the finely ground particles of hematite. The fluidizing medium is pumped by a pump 120 from a fluid reservoir 121 through a control valve 28 to the fluidizing system 23. One fluidizing medium which has been used successfully during experiments with the present invention is the gas, butane. However, air, pure oxygen, or other fluids might be used with equal effectiveness.

Within the apparatus of the present invention, the fluidized hematite FH is supplied to a combustor 10 from the fluidizing tank 20 through an ore feed pipe 122 in amounts determined by a control valve 22. It will be noted that the combustor 10 resembles a pulse-reactor, sometimes referred to as a pulse jet engine, developed and used primarily in the past for the propulsion of aircraft and rockets. For example, reference is made to United States Patent No. 2,812,635 to Le Foll et al., wherein is described a pulsatory engine of a similar design to that used for the combustor 10 in the apparatus of the present invention.

The above-mentioned objects of the present invention, are achieved through the use of the device known as a pulse-jet engine (herein referred to as a combustor). Briefly stated, these engines consist of a combustion chamber, an inlet pipe, and an exhaust pipe. Though structurally quite simple, effective and economical operation of these engines depends upon precise control of critical design parameters. These engines, at least in their valveless form, have no moving parts, and once started, continue operating in a resonant manner until their fuel supply is cut off.

The engines are started by supplying fuel, compressed air, and a spark to the combustion chamber. The fuel and air mixture explodes, creating hot gases which are driven out both the inlet and exhaust pipes of the engine. The explosion causes an over-expansion in the combustion chamber, which results in a partial vacuum in the combustion chamber after the explosion. This partial vacuum causes a fresh supply of air to be drawn in through the inlet pipe and part of the hot exhaust gases to be drawn back from the exhaust pipe into the combustion chamber. More fuel is injected into the combustion chamber, and the hot exhaust gases drawn back into the chamber provide the heat to ignite the new mixture of air and fuel. It is thus seen that continued operation requires no spark or compressed air to maintain operation once the operation is started, and that the engine will continue operation with no moving parts until such time as the fuel supply is cut off. It is also seen that there is an oscillating or pulsating supply of hot gases in the exhaust pipe which is continuously reversing direction at the resonant or operating frequency of the engine.

As shown in FIGURE 1, in the present beneficiating apparatus combustor 10 is attached to a supporting frame 14 which is rigidly mounted to a fixed base pedestal 15.

The combustor 10, according to the brief outline above, comprises a combustion chamber 11 to one end of which an air inlet tube 12 is connected and to the opposite end of which an exhaust pipe 13 is connected. A pump 32 draws fuel from a fuel tank 31 and pumps it (in amounts determined by a fuel valve 33) through a fuel line 34 to the combustor 10; the fuel line 34 is attached by a coupling 110 to the combustion chamber 11 of the combustor 10. As indicated above and as will be better understood from the description which hereafter follows, the combustor 10 will reignite without providing a continual spark in the combustion chamber thereof. However, a spark for igniting the initial fuel charge in the combustor 10 is provided by a spark plug 19, which is mounted on the combustion chamber 11 to have the spark gap thereof extending into the combustion chamber 11. A wire 112 interconnects the spark plug 19 and one side of a high tension coil or transformer 111, the other side of which is connected to a switch 18; a second terminal of switch 18 is connected to the positive side of battery 17 which has its negative terminal connected to ground.

In order to explain how the combustor 10 operates in the apparatus of the present invention, it will be assumed that the fuel pump 32 is operating and that the fuel valve 33 is open to supply fuel at a pressure of approximately 20 pounds per square inch, for example, to the combustion chamber 11. As described by Raymond M. Lockwood in his publication entitled "Pulse-Reactor, Low Cost Lift-Propulsion Engines" (a technical paper paper submitted on May 24, 1964, at the American Institute of Aeronautics and Astronautics, General Aviation Aircraft Design and Operations meeting in Wichita, Kans.), with fuel supplied to the combustion chamber 11, a spark is produuced at the spark gap of the spark plug 19 in response to a voltage applied thereto by the battery 17 and high tension coil 111 as the switch 18 is momentarily closed. When initial combustion occurs within the combustion chamber 11, the switch 18 is opened and pressure begins to build up in the combustion chamber 11. As the pressure builds up in the combustion chamber 11, gases blow out of both ends of the combustor 10, that is, from the inlet pipe 12 as well as from the exhaust pipe 13. Thus, high velocity streams of gases and supersonic pressure waves are well established from both air inlet and exhaust pipe ends of the combustor 10. Moreover, the pressure rise in the combustion chamber 11 causes fuel flow into the combustion chamber to be cut off. This pressure rise may go up as high as 30 lbs. per square inch whereas, as stated above, the fuel pressure is only approximately 20 lbs. per square inch, thereby providing an automatic cut-off of fuel at the fuel inlet coupling 110 during the combustion pressure rise.

Following the pressure rise in the combustion chamber 11, the gases within the combustion chamber over-expand causing a concomitant pressure drop in the combustion chamber 11. With pressure in the combustion chamber 11 at a level less than 10 p.s.i., fuel again begins to flow from the fuel line 34 into the combustion chamber 11, and there is a reversal of air flow back into the inlet pipe 12 and also up the exhaust pipe 13. Hot gases which did not leave the combustor 10 during the pressure rise portion of the combustion cycle are trapped within the exhaust pipe 13. These hot gases are swept back into the combustion chamber where they are thoroughly mixed with a fresh charge of fuel and air. Ignition occurs at many points due to the mixing of these hot gases with the new fuel charge. Operation is now more efficient than in the starting cycle. Pressure in the combustion chamber 11 is higher than in the instance where a single spark was used for ignition, because the burning time is considerably reduced. The combustor operating cycle is then repeated at a rate dependent on the diameter of the combustion chamber 11 in relation to the lengths of the inlet pipe 12 and the exhaust pipe 13. For example, a combustion rate of 100 cycles per second has been demonstrated for a combustor having a 5.25 inch diameter combustion chamber, an 8 inch long inlet pipe, and a 48 inch long exhaust pipe.

It is the vigorous mixing and stirring of the hot gases from the preceding cycle with the new fuel charge, and ignition at multiple points, which makes this engine quite insensitive to types of fuel, that is, to fuels with varying laminar flame speeds or reaction rates. The combustor can operate using a wide variety of fuels with little change in performance at sea level. This wide variety of fuels includes kerosene, gasoline, airplane fuel, crude oil, paint thinner and diesel fuel.

Returning now to the description of FIGURE 1, it may be seen, therefore, tthat the fluidized hematite is fed into the exhaust pipe throat of the combustion chamber 11 of the combustor 10 through a nozzle 16 which is pointed in a direction from the combustion chamber 11 towards the exhaust pipe 13. Accordingly, in a manner similar to fuel flow into the combustion chamber, fluidized hematite flows into the exhaust pipe throat combustion chamber during a pressure drop within the combustion chamber and such flow into the combustion chamber is blocked by a pressure rise occurring during the fuel combustion portion of the operating cycle. As each fuel explosion occurs within the combustion chamber 11, the temperature inside the combustion chamber is raised to approximately 4000° Farenheit. Each particle of the finely ground and fluidized hematite is subjected to that high temperature and to the pulsating movement of the gases as it is blown through the exhaust pipe in a reducing atmosphere at a high rate of speed. The particles are blown out the exhaust pipe 13 into a collecting chamber 40. By the time the particles reach the collecting chamber 40, the particles have been converted from the non-magnetic hematite H to a magnetic counterpart, magnetite M. In place of a collecting chamber 40, as shown in FIGURE 1, it is also possible to have the exhaust pipe 13 of the combustor 10 feed directly into a cyclone separator, which is well known in the art of separating magnetic ores and salacious gangue, from the combustion gases or into separating apparatus which utilizes the velocity of the stream of gases and particles being discharged from the exhaust pipe 13 to power the separator, or into other apparatus commonly used in iron ore processing plants.

In this regard, attention is directed to FIGURE 2, wherein there is shown a modified version of the combustor 10 as it might be used in an iron ore processing plant. It will be noted that the combustor 10 has been fabricated using six interlocked blocks of refractory material that are held together by tie rods 57 and 59. For example, the combustion chamber 11 of the combustor 10 is formed within refractory blocks 52, 53, and 54; the exhaust pipe 13 is formed by a pair of refractory blocks 50 and 51, and the inlet pipe 12 is formed within a refractory block 55. A combuster constructed in this manner could operate at elevated temperatures for extended periods of time without requiring any maintenance.

FIGURE 2 also illustrates a magnetic separator 41 positioned at the outlet port of the exhaust pipe 13 to advantageously use the energy present in the high velocity stream of gases and material exiting the exhaust pipe 13 for the separation of the magnetite particles M from the remaining hematite particles H and other gangue present in the jet stream. The separator 41 may include, for example, as shown in FIGURE 3 a long passageway 43 formed within refractory material and exiting into two containers 44 and 45 that are separated by a wall 46. Embedded within the refractory material in close proximity to the channel 43 is positioned a magnet 42 which generates a strong magnetic field. Thus, as the high velocity stream of gases and finely divided particles exit the exhaust pipe 13, the stream enters the channel 43 and tends to pass through that channel 43 into the container 44. The magnetic particles of magnetite in the high velocity stream are attracted by the strong magnetic field generated by the magnet 42 and tend to be diverted from the container 44 into the container 45 in a manner similar to the bending of an electron stream within a traveling wave tube. Accordingly, the container 45 is filled with magnetic particles of magnetite M, whereas the container 44 is filled with the unconverted hematite particles H and the other non-magnetic residue expelled from the combustor 10.

To take further advantage of the energy being expelled from the combustor 10, as shown in FIGURE 2, a thrust augmentor 61 is shown to be positioned in line with the inlet pipe 12 to pump large quantities of air utilizing the velocity of the stream exiting the inlet pipe. In some cases, nearly as much thrust is obtained from the inlet end of a pulse reactor as is obtained from the exhaust pipe end. As is well known in the propulsion art, there is a pressure drop on the inlet end of the thrust augmentor 61 which induces a flow of air into the thrust augmentor over the lip 62 of the thrust augmentor 61. The net effect is a relatively large mass flow of ambient air induced through the augmentor, sometimes as much as 10 to 20 times as much as is contained in the primary air stream jet exiting the inlet pipe 12. However, with or without the augmentor 61, the inlet high velocity gases can be directed onto a turbine wheel 63 for rotating that turbine wheel at a high velocity. The rotation of the turbine wheel 63 is shown to be coupled through a shaft 65 to an electrical generator 67 for providing an output of electrical power that may be used to drive other equipment within the iron ore processing plant.

It is to be understood that the above-described arrangements are illustrative of the application of the principles of the invention with reference to a specific apparatus designed to carry the invention into practice. Numerous other arrangements may be devised by those skilled in the art without departing from the spirit and scope of the invention. Thus, by way of example and not of limitation, other types of separators may be used in place of the magnetic separator 41 or the collecting chamber 40 for obtaining the magnetite M from the other materials that may be dispelled from the exhaust pipe 13 of the combustor 10. Moreover, other apparatus which use the energy contained within the high velocity stream of gases and material exiting the exhaust pipe 13 to drive ore separators or to generate power for energizing peripheral equipment are fully within the contemplation of the present invention. It is also suggested and contemplated that a plurality of combustors 10 may be used in a series relationship for totally converting hematite to pure iron, the magnetite and residue discharge from one combustor being fed into the combustion chamber of the succeeding combustor.

It should be noted, also, that usage of the beneficiating apparatus described above is not limited to iron recovery. Rather, as suggested above, iron-bearing nickel ore may be fluidized and fed into the combustor 10. Since the non-magnetic iron is closely bound to the nickel ore, magnetization of that iron facilitates concentration and recovery of the nickel. One may beneficiate, therefore, numerous types of ores which contain iron closely bound to the metal to be recovered. Moreover, the beneficiating process of the present invention could be carried out using oxides of iron or blast furnace dust in place of pure hematite, for example.

Further, there are various types of materials that may be used in constructing the apparatus of the present invention for economically beneficiating iron-bearing ores on a large scale. For example, the combustor 10 may be constructed of steel, refractory material, or other exotic materials, such as Haynes 25 (L–605), manufactured by Union Carbide Stellite Co., Kokomo, Ind., depending upon the amount of ore to be beneficiated by the apparatus and the length of time the apparatus is to be operating. Accordingly, from the foregoing it is evident that

What is claimed as new is:

1. Apparatus for beneficiating iron-bearing ore, said apparatus comprising:
   a pulse jet engine including a combustion chamber, an air inlet tube connected to said combustion chamber, an exhaust pipe extending from said combustion chamber, and means for causing periodic explosions within said combustion chamber;
   means for introducing finely divided particles of iron-bearing ore into said combustion chamber near said exhaust pipe; and
   means connected to said exhaust pipe for collecting the beneficiated material projected therefrom.

2. The combination as defined in claim 1 wherein said mean for introducing iron-bearing ore into said combustion chamber comprises means for receiving iron-bearing ore, a reservoir, a fluid within said reservoir, and means coupled to said reservoir and to said receiving means for mixing the iron-bearing ore with said fluid.

3. The apparatus as defined in claim 1 wherein said means for collecting the beneficiated material comprises a cyclone separator.

4. The combination as defined in claim 1 which further includes a turbine-driven generator positioned adjacent said air inlet tube, gases being expelled from said air inlet tube being directed onto said turbine for turning said turbine, thereby energizing said generator.

5. The combination as defined in claim 1 wherein said means for collecting the beneficiated material comprises a first and a second container, a tube having an inlet end thereof positioned so as to receive material exiting said exhaust pipe, the other end of said tube being bifurcated so as to exit into said two separate containers, said first container being in line with the inlet end of said tube and said second container being disposed away from the normal flow of material in said tube, and a magnet positioned adjacent the inlet end of said tube for pulling magnetic iron-bearing material away from the normal path of material from said inlet end of said tube to said first container and diverting that iron-bearing material into said second container.

6. The apparatus as defined in claim 2 wherein the fluidized iron-bearing ore is introduced into said combustion chamber in a direction so as to be projected from said combustion chamber through said exhaust pipe.

References Cited

UNITED STATES PATENTS

| | | | |
|---|---|---|---|
| 2,441,613 | 5/1948 | Balassa | 241—5 X |
| 2,826,369 | 3/1958 | Haltmeier | 75—1 X |
| 3,052,533 | 9/1962 | Thomsen | 75—11 |

OSCAR R. VERTIZ, Primary Examiner

G. O. PETERS, Assistant Examiner

U.S. Cl. X.R.

23—1; 60—39; 75—1; 266—13